United States Patent
Wigard et al.

(10) Patent No.: US 8,774,097 B2
(45) Date of Patent: Jul. 8, 2014

(54) METHOD AND APPARATUS FOR PLANNING OF CELL SIZES AND FREQUENCY USE IN A WIRELESS COMMUNICATIONS NETWORK

(75) Inventors: Jeroen Wigard, Klarup (DK); Istvan Zsolt Kovacs, Aalborg (DK); Gilbert Micallef, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 104 days.

(21) Appl. No.: 13/497,274

(22) PCT Filed: Sep. 24, 2009

(86) PCT No.: PCT/EP2009/062397
§ 371 (c)(1),
(2), (4) Date: Mar. 21, 2012

(87) PCT Pub. No.: WO2011/035808
PCT Pub. Date: Mar. 31, 2011

(65) Prior Publication Data
US 2012/0263109 A1    Oct. 18, 2012

(51) Int. Cl.
*H04W 16/00* (2009.01)
*H04W 36/00* (2009.01)

(52) U.S. Cl.
USPC .......................................... 370/328; 455/443

(58) Field of Classification Search
USPC ........ 370/328, 331, 334; 455/422.1, 443, 446
See application file for complete search history.

(56) References Cited

U.S. PATENT DOCUMENTS

| | | | |
|---|---|---|---|
| 5,839,071 A * | 11/1998 | Johnson | 455/440 |
| 6,507,741 B1 * | 1/2003 | Bassirat | 455/440 |
| 6,985,736 B1 | 1/2006 | Aalto | 455/447 |
| 8,095,143 B2 * | 1/2012 | Amirijoo et al. | 455/452.1 |
| 8,385,293 B2 * | 2/2013 | Rajasimman et al. | 370/332 |
| 2006/0246887 A1 * | 11/2006 | Barclay et al. | 455/423 |
| 2007/0123292 A1 * | 5/2007 | Kang et al. | 455/525 |

FOREIGN PATENT DOCUMENTS

WO    WO 01/05179 A1    1/2001

* cited by examiner

*Primary Examiner* — Brian D Nguyen
(74) *Attorney, Agent, or Firm* — Harrington & Smith

(57) ABSTRACT

A method including providing at least a first and a second operationally adjacent base stations; each base station providing at least one cell in respect of a first carrier and at least one cell in respect of a second carrier, and wherein for each carrier, the respective cell areas overlap, and wherein for a first carrier, the cell area provided by the first base station is substantially larger than the cell area provided by the second base station.

13 Claims, 5 Drawing Sheets

METHOD AND APPARATUS FOR PLANNING OF CELL SIZES AND FREQUENCY USE IN A WIRELESS COMMUNICATIONS NETWORK

This disclosure relates to the operation of communications networks, and has particular but not exclusive application to frequency reuse.

A communication system can be seen as a facility that enables communication sessions between two or more entities. The communications may comprise, for example, communication of voice, electronic mail (email), text message, multimedia, other data and so on. A communication system can be provided for example by means of a communication network and one or more compatible communication devices. The communication network may be a local network.

A user can access a communication system by means of an appropriate communication device. A communication device of a user is often referred to as user equipment (UE). A communication device is provided with an appropriate signal receiving and transmitting apparatus for enabling communications, for example enabling fixed or wireless access to a communication network or communications directly with other users. Users may thus be offered and provided numerous services via their communication devices. Non-limiting examples of these services include two-way or multi-way calls, data communication or multimedia services or simply an access to a data communications network system, such as the Internet. A user who has accessed a system may also be provided broadcast or multicast content. Non-limiting examples of the content include downloads, television and radio programs, videos, advertisements, various alerts and other information.

This disclosure has particular but not exclusive application to communication networks which typically comprise a plurality of base stations, or Node Bs, with which a user equipment (UE) can communicate with when located in e.g. a cell for which a base station provides coverage. These are often under the control of a network controller. Alternatively the network of base station may not have central control, such as autonomous networks.

In wireless (e.g. cellular networks), frequency reuse is well known. It is a technique which provides a large distance to co-channel interference ratio. This improves the signal to interference ratio as well as the signal to noise ratio. The disadvantages of frequency reuse techniques are that the available radio spectrum is split; certain frequencies are allocated to certain base stations and other frequencies to other base stations. This leads to reduced resources (for e.g. scheduling purposes) and thus to lower overall cell spectral efficiency. The main benefit for cell edge users is lower interference from frequency reuse (and interference for them is larger than for cell center users so the benefit is larger). In contrast however, the only benefit for user equipment located in the cell centres is limited to a reduction in inter-cell interference.

In order to benefit from the different impact of frequency reuse on cell edge and cell centre users, it is known to provide an enhanced reuse pattern whereby different frequencies are designated different cell sizes; that is to say the coverage areas (e.g. for each carriersfrequency) provided by base stations may differ. In such arrangements, cell centre users use a first carrier provided in a smaller cell (coverage area) whereas cell edge users use a second carrier provided by cells where the coverage area provided by both base stations is large.

The problem however, is that only a limited capacity is available at the cell edge as less carriers (e.g. only one carrier) are available.

Embodiments of the invention provide an improved method and apparatus to enhance capacity as well as limit overheads in user equipments operating and moving around cell edges.

An embodiment includes a method comprising providing at least first and second operationally adjacent base stations; each base station providing at least one cell in respect of a first carrier and at least one cell in respect of a second carrier, and wherein for each carrier, the respective cell areas overlap, and wherein for a first carrier, the cell area provided by the first base station is substantially larger than the cell area provided by the second base station.

Preferably the cell area provided by the first base station for the second carrier is substantially smaller than the cell area for said second carrier provided by said second base station.

The carriers may be different frequencies.

The cell area may be adjusted by adjusting transmission power andor the tilt of one or more antenna(e).

The cell area provided by the first base station for the first carrier may be of comparable size to the cell area for provided by said seconds base station for said second carrier andor the cell area provided by said first base station for said second carrier is of comparable size to said cell area provided by said second base station for said first carrier.

Embodiment of the invention includes a computer program comprising program code means adapted to perform the steps of any of the preceding methods when the program is run on a processor, as well as a computer readable medium comprising such a computer program.

An embodiment of the invention also includes a base station, or processor therefor, including means to provide a first and a second cell coverage area, each in respect of two carriers, and such that for each respective carrier, the cell areas overlap with cell areas for the two said carriers provided by a second base station, and wherein for the first carrier, the cell area provided is substantially larger than the cell area provided by the second base station.

For the second carrier, the cell area provided is preferably substantially smaller than that provided by said second base station.

The carriers may be different frequencies.

The base station may include means to adjust the power to andor of the tilt of one or more antennae.

Preferably, the cell area provided for the first carrier is of comparable size to the cell area for provided by said seconds base station for said second carrier, andor, the cell area provided by said first base station for said second carrier is of comparable size to said cell area provided by said second base station for said first carrier.

An embodiment of the invention also includes a control element, or processor therefor, having means to control two operationally adjacent base stations, comprising means to instruct each base station so as to provide at least two cells in respect of two carriers, and such that for each respective carrier, the cell areas overlap; and wherein for the first carrier, the cell area provided by the first base station is substantially larger than the cell area provided by the second base station.

The cell area provided by the first base station for the second carrier may be substantially smaller than the cell area for said second carrier provided by said second base station.

The cell area provided by the first base station for the first carrier may be of comparable size to the cell area for provided by said seconds second area for said second carrier; andor the cell area provided by said first base station for said second carrier is of comparable size to said cell area provided by said second base station for said first carrier.

For a better understanding of the present invention and how the same may be carried into effect, reference will now be made by way of example only, and to the accompanying drawings in which.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

Figure 1:
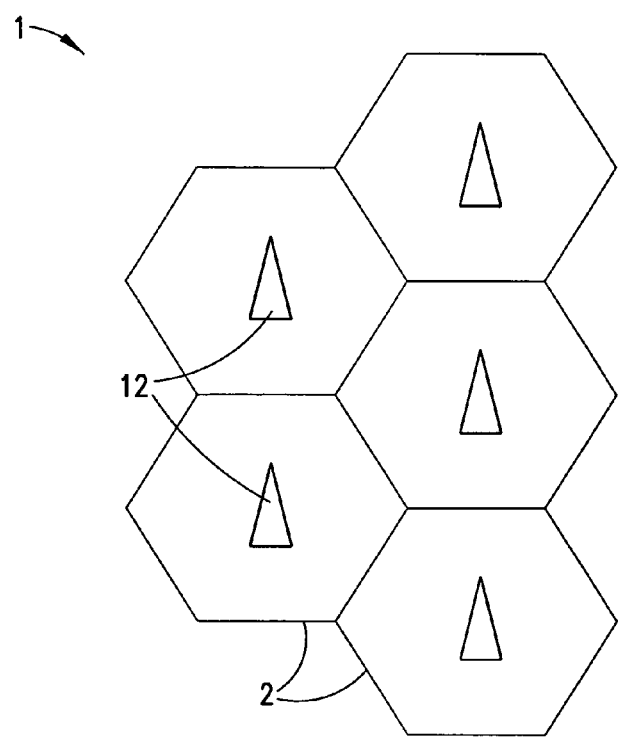
FIG. 1 shows an example of a traditional fixed communication system.

A communication device can be used for accessing various services andor applications provided via a communication system. FIG. 1 shows a typical communication system 1 comprising a number of cells 2, each associated with particular fixed base stations 12. Non-limiting examples of appropriate access nodes are a base station of a cellular system, for example what is known as NodeB or enhanced NodeB (eNB) in the vocabulary of the 3GPP specifications. Other examples include base stations of systems that are based on technologies such as wireless local area network (WLAN) andor WiMax (Worldwide Interoperability for Microwave Access). The base stations may be in communication with a Network Controller (not shown). The base stations may be connected to a wider communications network (not shown). A gateway function may also be provided to connect to another network. This further network may also be connected to a further access system, which serves user devices.

A communication device can be used for accessing various services andor applications through the communication system. A mobile communication device is typically provided wireless access via at least one base station 12 or similar wireless transmitter andor receiver node of the access system. A base station site can provide one or more cells of the plurality of cells of a cellular communication system. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. An example of the more recent developments in the standardization is the long-term evolution (LTE) of the Universal Mobile Telecommunications System (UMTS) radio-access technology that is being standardized by the 3rd Generation Partnership Project (3GPP). A further development of the LTE is referred to as LTE-Advanced. Other techniques may be used such as orthogonal frequency divisional multiple access (OFDMA) and SC-FDMA, e.g. for downlink and uplink operation respectively.

Figure 2:
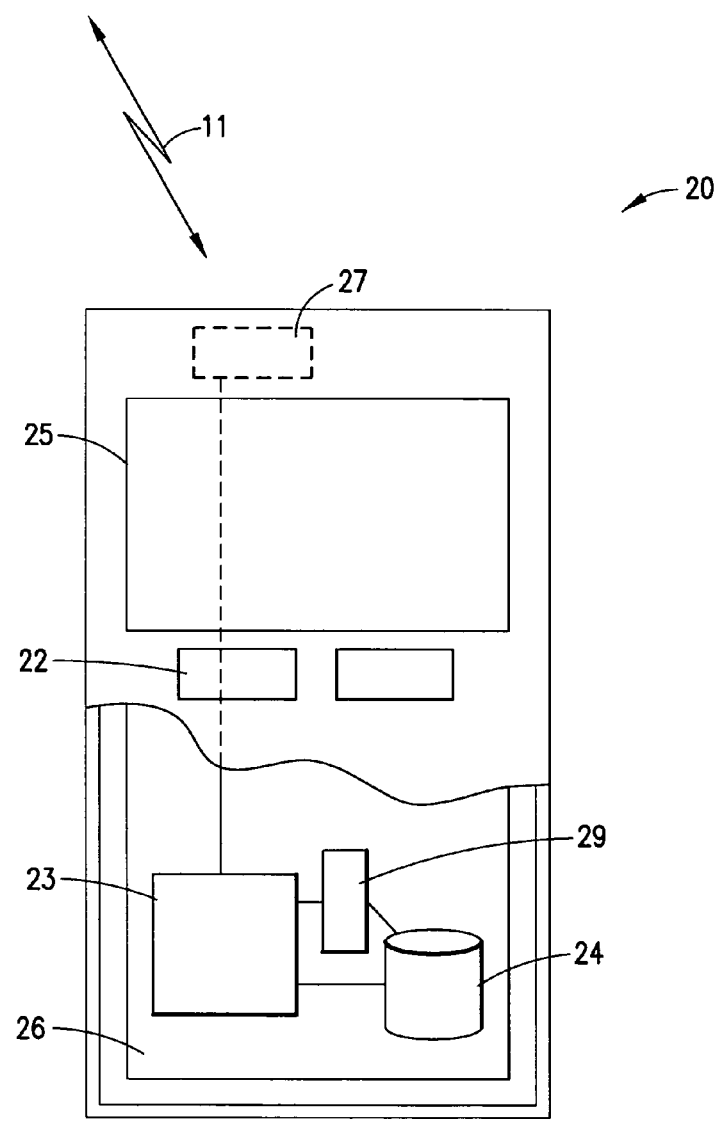
FIG. 2 shows an example of a communication device.

FIG. 2 shows a schematic, partially sectioned view of a communication device 20 that can be used for communication with a communication system. An appropriate mobile communication device may be provided by any device capable of sending and receiving radio signals. Non-limiting examples include a UE, a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device may receive signals over an air interface 11 via appropriate apparatus for receiving and may transmit signals via appropriate apparatus for transmitting radio signals. In FIG. 2 a transceiver is designated schematically by block 27. The transceiver may be provided for example by means of a radio part and associated antenna arrangement. The antenna arrangement may be arranged internally or externally to the mobile device.

A mobile device is also typically provided with at least one data processing entity 23, at least one memory 24 and other possible components 29 for use in software aided execution of tasks it is designed to perform, including control of access to and communications with access systems. The data processing, storage and other relevant control apparatus can be provided on an appropriate circuit board andor in chipsets. This feature is denoted by reference 26. The controller may include functionality to carry out any embodiments of the invention. The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices andor for connecting external accessories, for example hands-free equipment, thereto.

Figure 3:
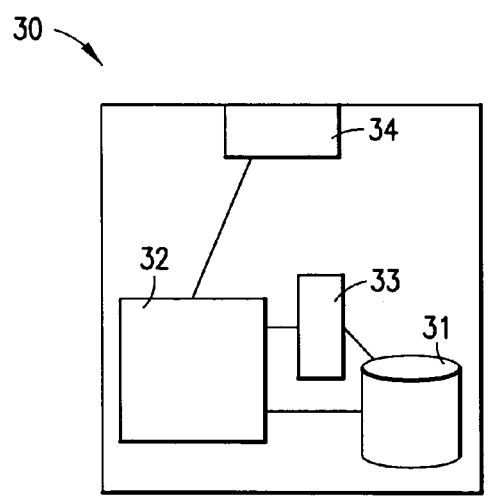
FIG. 3 shows an example of a controller for a base station.

FIG. 3 shows an example of a control apparatus 30 for a base station. The control apparatus 30 can be arranged to provide control on communications by roaming mobile communication devices according to embodiments of the invention. The control apparatus 30 may be configured to implement any of the embodiments of the invention. The control apparatus 30 can be configured to execute an appropriate software code to provide the control functions as explained below in more detail. For this purpose the control apparatus may comprise at least one memory 31, at least one data processing unit 32, 33 and an inputoutput interface 34. Via the interface the control apparatus can be coupled to a receiver and a transmitter of the system, for example a base station antenna, so that it can receivetransmit a transmission fromto the communication device. Control of the base stations may provide means to adjust the power andor tilt of the antenna(e), and hence the cell areas for each carriers (frequency).

Figure 4:
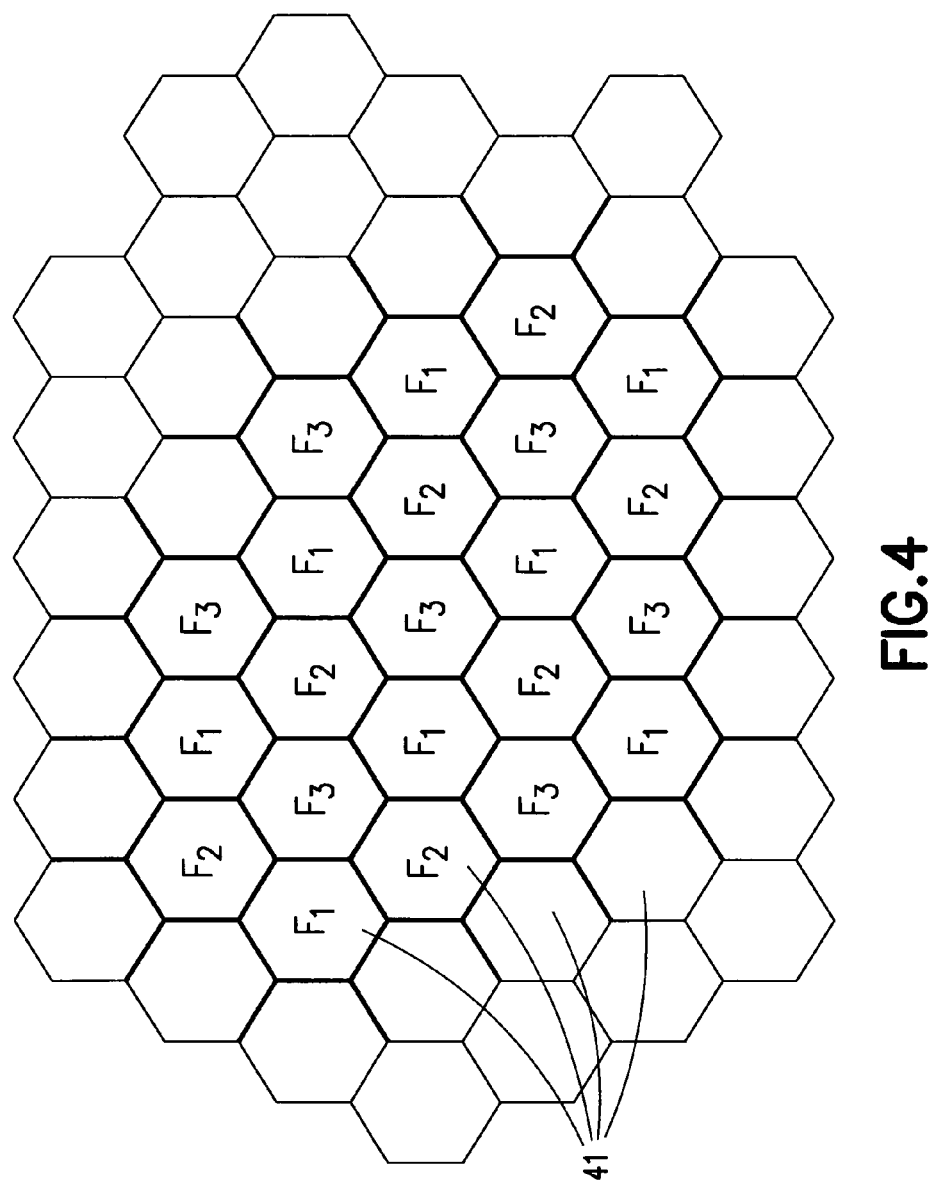
FIG. 4 show a schematic representation illustrating frequency reuse in cells of a communication network.

FIG. 4 shows a portion of a cellular network illustrating the technique of frequency reuse, which can ensure that interference remains below a detrimental level. Adjacent cells use different frequencies. In FIG. 4, a set of three frequencies, F1, F2, F3 are used in such a way that each base station is designated the use one of these frequencies in such a way that no cell, 41, which borders each other, share the same frequency. The reuse pattern forms a regular pattern over a service area.

Figure 5:
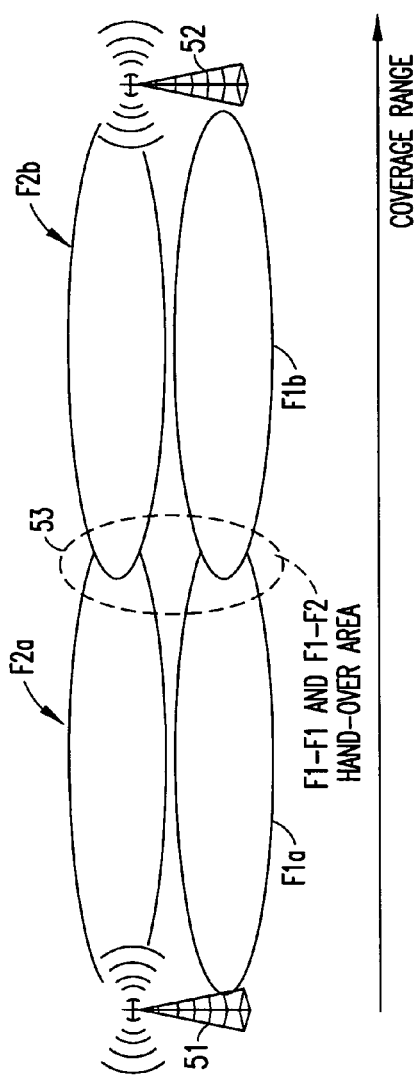
FIG. 5 illustrates schematically a portion of a conventional communication network where two different carriers are used by two base stations.

FIG. 5 shows a simple conventional set-up for two different carriers comprising two frequency layers. Two operationally adjacent base stations, 51 and 52 each operate two different carrier frequencies F1 and F2 (marked by the shaded and unshaded ellipses). Such a set up may be implemented in WCDMA HSPA LTE networks with multiple carriers (layers). All layers may use a frequency reuse value 1. The coverage areas (F1a, F2a, F2b, F2a) provided by each base stations, for each frequency respectively, is approximately the same in terms of area, as shown by the elliptical areas in the figure. There is a general handover region 53 indicated by the broken line; and can be viewed as an F1-F1 and an F2-F2 handover area. In this region radio resources are split into F1 and F2, thus reducing available resource.

Figure 6:
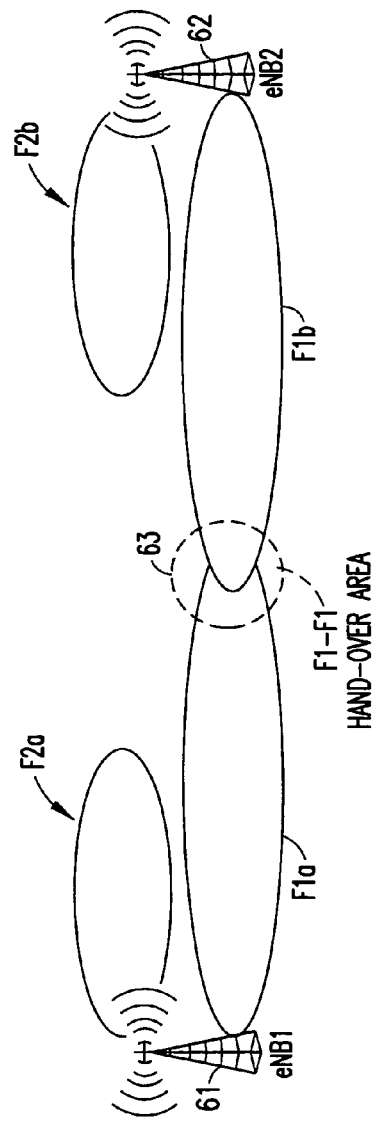
FIG. 6 illustrates schematically a portion of a communication network where two different carriers are used by two base stations providing different cells sizes.

FIG. 6 shows a simple set-up illustrating the technique of providing frequency reuse with different cell sizes. Each base station 61 and 62 transmits on two frequency carriers, F1 and F2 as before. The coverage area (cell size) provided by each of the base stations for F2 (F2a and F2b) is small in comparison with the cell sizes provided by F1 (F1a, F1b). The cells overlap in the handover region 63 shown by the broken line. Stationary traffic close to the base station can be provided by the small (micro) cells (on frequency F2), whereas the other traffic is carried by the larger (macro) layer (on frequency F1). This provides a different impact of frequency reuse for user equipment operating on the cell edge and cell centre. The smaller (e.g. F1) cells provide less interference in frequency use away from these cells. By off-loading the larger cells enough, the larger cells get fractionally loaded, which can be seen as a kind of frequency reuse larger than value 1.

The above technique suffers from the disadvantage that only limited capacity is available at the cell edge, since only large cells are available (e.g. on just frequency F1 in the example above). Furthermore, when a user equipment moves from the area close to the base station, it needs to make an inter-frequency handover if it moves to the cell edge. Inter-frequency handovers take typically a relatively long time to implement and require gaps in the transmission to allow the user equipment to perform necessary measurements on the other frequency, which can degrade the quality of service.

Figure 7:
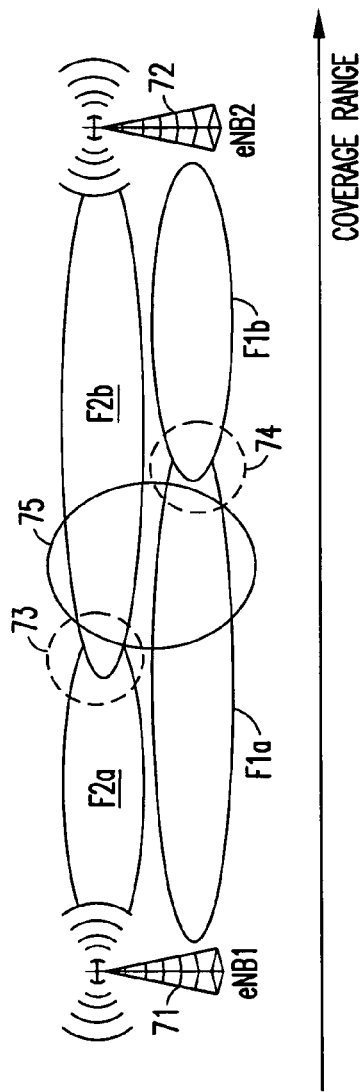
FIG. 7 illustrates one embodiment of the invention.

One embodiment of the invention will now be described with reference to FIG. 7. The invention is applicable to any wireless network where different layers on different carriers (e.g. frequencies) are used; e.g. LTE. FIG. 7 shows again two base stations each providing coverage using two frequencies F1 and F2. The two frequencies are interleaved as explained hereinafter. A base station 71 provides two cells for each frequency (F1a and F2a respectively), each having a different coverage area in terms of size. Likewise base station 72 also provides two cells for each of the same frequencies (F1b and F2b) again each having a different coverage areas in terms of size.

In this particular embodiment, the area provided for F2 by base station 71 (F2a) is of comparable size to area provided by base station 72 for F1 (F1b). These areas are small in comparison to the area provided by base station 71 for F1 (F1a), which is also of comparable size to that provided by base station 72 for F2 (F2b).

There are three handover areas provided by this arrangement. A first handover area 73 is an F2 handover area; a second handover area 74 is an F1 handover area, and a third hand-over area, 75 is an F1F2 handover area. This latter inter-frequency handover area is large in size; especially in comparison to the handover areas in the previous figures. This offers advantages of having a wide roaming range for handover as well as good signal strength over much of it.

The different cell sizes may be created by antenna tilting andor adjusting the output transmit power. All carriers may be available for the full area covered by the multi-carrier eNB's within the coverage area of one eNBcell the different carriers have different 'sizes'. The scheme as shown in FIG. 7 can simply be achieved by planning the coverage of the different frequencies differently (add an 'offset' to one cell for one frequency and deduct it from the other). This can be achieved in practice by using different output power andor antenna tilting; as mentioned.

Figure 8:
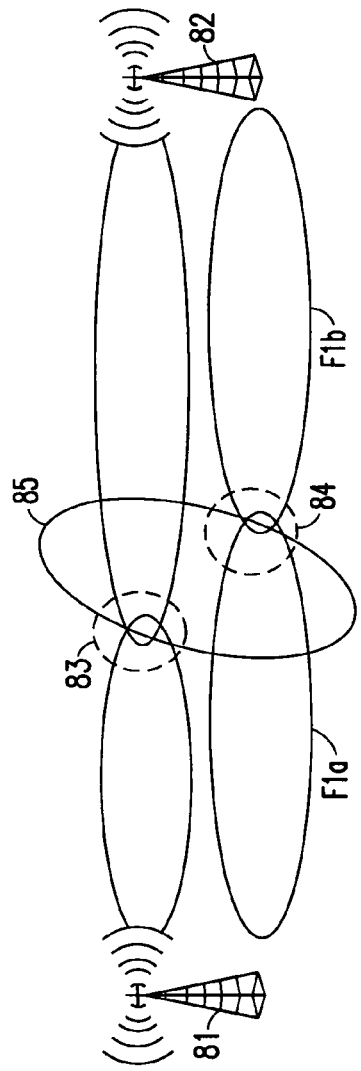
FIG. 8 illustrates another embodiment of the invention.

Other alternative embodiments would also be seen to fall within the scope of the invention. For example it is not necessary that each base station provide different size cells. The cells provided by one base station for each frequency may be for example of the same size. The other base station may still provide a larger cell for one of the frequencies, and a smaller one for another frequency, and thus still provide a larger overlap area than the prior art. FIG. 8 shows base station 81 and 82 each providing cells, F1a, F2a, F1b, F2b, for frequencies F1 and F2 respectively. Areas of cells F1a and F1b are of the same size. Intra-frequency handover areas 83 and 84 are thus set up as before. Additionally the inter-frequency (F1F2) handover area 85 provided is of substantial size in contrast to the prior art; although not as large as in the FIG. 7 embodiment.

In principle, the base stations (e.g. eNBs) may belong to the same site or different sites. However, the main advantage of this set-up is when it is applied to eNB's from different sites.

The advantages of embodiments are that they provide more flexible control of handover area configurations according to specific requirements (e.g. for the above examples, the F1-F2, F1-F1 and F2-F2 handover area configurations). Such an arrangement allows for a reduction in inter-frequency handovers. At the same time it maintains the advantages of frequency reuse using different cell sizes, since traffic close to the base station can still be provided for by a small (micro) cell. Embodiments also provide improved SINR in the handover areas. In the uplink, UEs of the smaller cells do not need to send with full power to reach the base station, which results in less interference in the handover area, i.e. in the larger cell. As a consequence, embodiments allow for a reduction in UE power consumption. It additionally allows better off-loading of cells in low-mobility but high load traffic scenarios.

As explained, it would be clear to the skilled person that the different cell areas can be provided and varied by suitable means. For example the power may be varied andor the directivity of antennae may be changed vertically or horizontally. Thus the cell sizes (i.e. the coverage area) can be provided by using antenna tilting or other means. By electrical tilting one can modify the cell sizes dynamically. The adoption of remote electric tilt (RET) also allows the set-up to be varied as in e.g. Self Organised Networks.

The invention is also applicable to heterogeneous scenarios where base stations may be provide network(s) of different cells sizes, e.g. where a base station (eNB) may provide a micro andor pico cell.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
providing at least first and second operationally adjacent base stations; each base station providing at least one cell in respect of a first carrier and at least one cell in respect of a second carrier;
wherein for the first carrier, a first cell area provided by the first base station is substantially larger than a second cell area provided by the second base station, such that, for each carrier, the respective cell areas overlap; and
providing a first handover area for the first carrier that does not overlap a second handover area for the second carrier, by configuring a third cell area provided by the first base station for the second carrier to be substantially smaller than a fourth cell area for the second carrier provided by the second base station.

2. A method as claimed in claim 1 wherein said carriers are for different frequencies.

3. A method as claimed in claim 1 wherein said cell area are adjusted by adjusting transmission power and/or the tilt of one or more antennas of said base stations.

4. A method as claimed in claim 1 wherein the cell area provided by the first base station for the first carrier is of comparable size to the cell area provided by said second base station for said second carrier, and/or the cell area provided by said first base station for said second carrier is of comparable size to said cell area provided by said second base station for said first carrier.

5. A computer program comprising program code adapted to perform the steps of claim 1 when the program is run on a processor.

6. A non-transitory computer readable medium on which the computer program of claim 5 is stored.

7. A base station comprising one or more processors and one or more memories including computer program code, the one or more memories and the computer program code being configured, with the one or more processors, to cause the base station to perform at least the following:
providing a first carrier and a second carrier, wherein, for the first carrier, a first cell area provided by the base station is substantially larger than a second cell area provided by a further base station, such that, for each respective carrier, the respective cell areas overlap; and
providing a first handover area for the first carrier that does not overlap a second handover area for the second carrier, by configuring a third cell area provided by the base station for the second carrier to be substantially smaller than a fourth cell area for the second carrier provided by the further base station.

8. A base station as claimed in claim 7, wherein said carriers are for different frequencies.

9. A base station as claimed in claim 7, wherein said providing a first and a second cell area comprises adjusting power to one or more antennas, and/or adjusting the tilt of one or more antennas.

10. A base station as claimed in claim 7, wherein the cell area provided for the first carrier is of comparable size to the cell area provided by said further base station for said second carrier, and/or the cell area provided by said base station for said second carrier is of comparable size to said cell area provided by said further base station for said first carrier.

11. A control element configured for controlling two operationally adjacent base stations comprising at least a first base station and a second base station, the control element comprising one or more processors and one or more memories including computer program code, the one or more memories and the computer program code being configured, with the one or more processors, to cause the control element to perform at least the following:
instructing each base station so as to provide at least two cells in respect of two carriers comprising a first carrier and a second carrier, wherein, for the first carrier, a first cell area provided by the first base station, is substantially larger than a second cell area provided by the second base station, such that, for each respective carrier, the respective cell areas overlap; and
providing a first handover area for the first carrier that does not overlap a second handover area for the second carrier, by configuring a third cell area provided by the first base station for the second carrier to be substantially smaller than a fourth cell area for the second carrier provided by the second base station.

12. A control element as claimed in claim 11, wherein said carriers are for different frequencies.

13. A control element as claimed in claim 11, wherein the cell area provided by the first base station for the first carrier is of comparable size to the cell area provided by said second area for said second carrier; and/or the cell area provided by said first base station for said second carrier is of comparable size to said cell area provided by said second base station for said first carrier.

* * * * *